US012593225B2

(12) United States Patent
Xu et al.

(10) Patent No.: US 12,593,225 B2
(45) Date of Patent: Mar. 31, 2026

(54) METHOD AND SYSTEM FOR DEPLOYING WIRELESS HEADSET BASED ON THIRD-PARTY PLATFORM

(71) Applicant: YEALINK (XIAMEN) NETWORK TECHNOLOGY CO., LTD., Xiamen (CN)

(72) Inventors: Jinhui Xu, Xiamen (CN); Yi Xing, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 339 days.

(21) Appl. No.: 18/518,648

(22) Filed: Nov. 24, 2023

(65) Prior Publication Data

US 2024/0179540 A1 May 30, 2024

(30) Foreign Application Priority Data

Nov. 25, 2022 (CN) .......................... 202211497581.5

(51) Int. Cl.
| | |
|---|---|
| *H04W 24/02* | (2009.01) |
| *H04W 12/06* | (2021.01) |
| *H04W 60/04* | (2009.01) |
| *H04W 76/10* | (2018.01) |

(52) U.S. Cl.
CPC ........... *H04W 24/02* (2013.01); *H04W 12/06* (2013.01); *H04W 60/04* (2013.01); *H04W 76/10* (2018.02)

(58) Field of Classification Search
CPC ..... H04W 24/02; H04W 12/06; H04W 60/04; H04W 76/10; H04W 12/0431; H04W 12/33; H04W 12/50; H04R 2420/07; H04R 1/1041
See application file for complete search history.

(56) References Cited

U.S. PATENT DOCUMENTS

| | | | | |
|---|---|---|---|---|
| 9,131,370 | B2 * | 9/2015 | Schrecker | .............. H04W 12/04 |
| 2003/0100274 | A1 * | 5/2003 | Brown | .................. H04M 1/725 |
| | | | | 455/90.1 |
| 2004/0063475 | A1 * | 4/2004 | Weng | .................. H04M 1/6066 |
| | | | | 455/575.1 |
| 2008/0318639 | A1 * | 12/2008 | Crestol | ............... H04M 1/6066 |
| | | | | 455/569.1 |
| 2012/0094602 | A1 * | 4/2012 | Lee | ..................... H04M 1/6066 |
| | | | | 455/41.2 |
| 2018/0025149 | A1 * | 1/2018 | Watson | .............. B64D 11/0015 |
| | | | | 726/2 |
| 2019/0243530 | A1 * | 8/2019 | De Ridder | .......... G06F 3/04815 |

FOREIGN PATENT DOCUMENTS

WO      WO-2018044100 A1 *   3/2018   ........... H04B 1/3827

* cited by examiner

*Primary Examiner* — Joseph Suh

(57) ABSTRACT

The present disclosure provides a method, device, and system for deploying a wireless headset based on a third-party platform. The method includes: receiving, by a third-party platform, a headset list sent by a base station, and selecting a headset based on the headset list for deployment; after deploying the headset, sending deployment information of the headset and authentication information of the third-party platform to the base station, to enable the base station to feed back an authentication result based on the deployment information and the authentication information; and obtaining a deployment result of the headset based on the authentication result. This reduces a difficulty in deploying a wireless headset and improves universality of deploying the wireless headset.

14 Claims, 9 Drawing Sheets

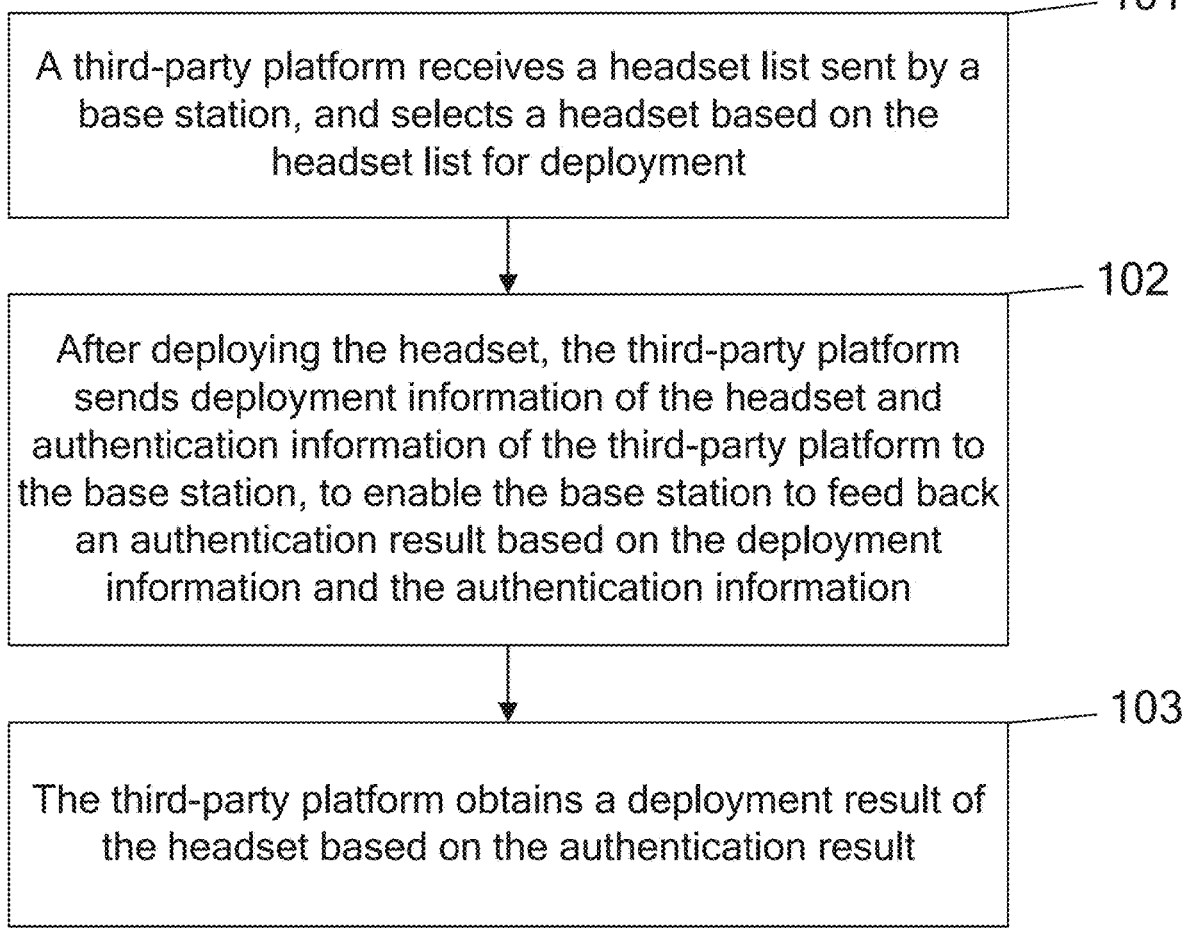

A third-party platform receives a headset list sent by a base station, and selects a headset based on the headset list for deployment — 101

After deploying the headset, the third-party platform sends deployment information of the headset and authentication information of the third-party platform to the base station, to enable the base station to feed back an authentication result based on the deployment information and the authentication information — 102

The third-party platform obtains a deployment result of the headset based on the authentication result — 103

FIG. 1

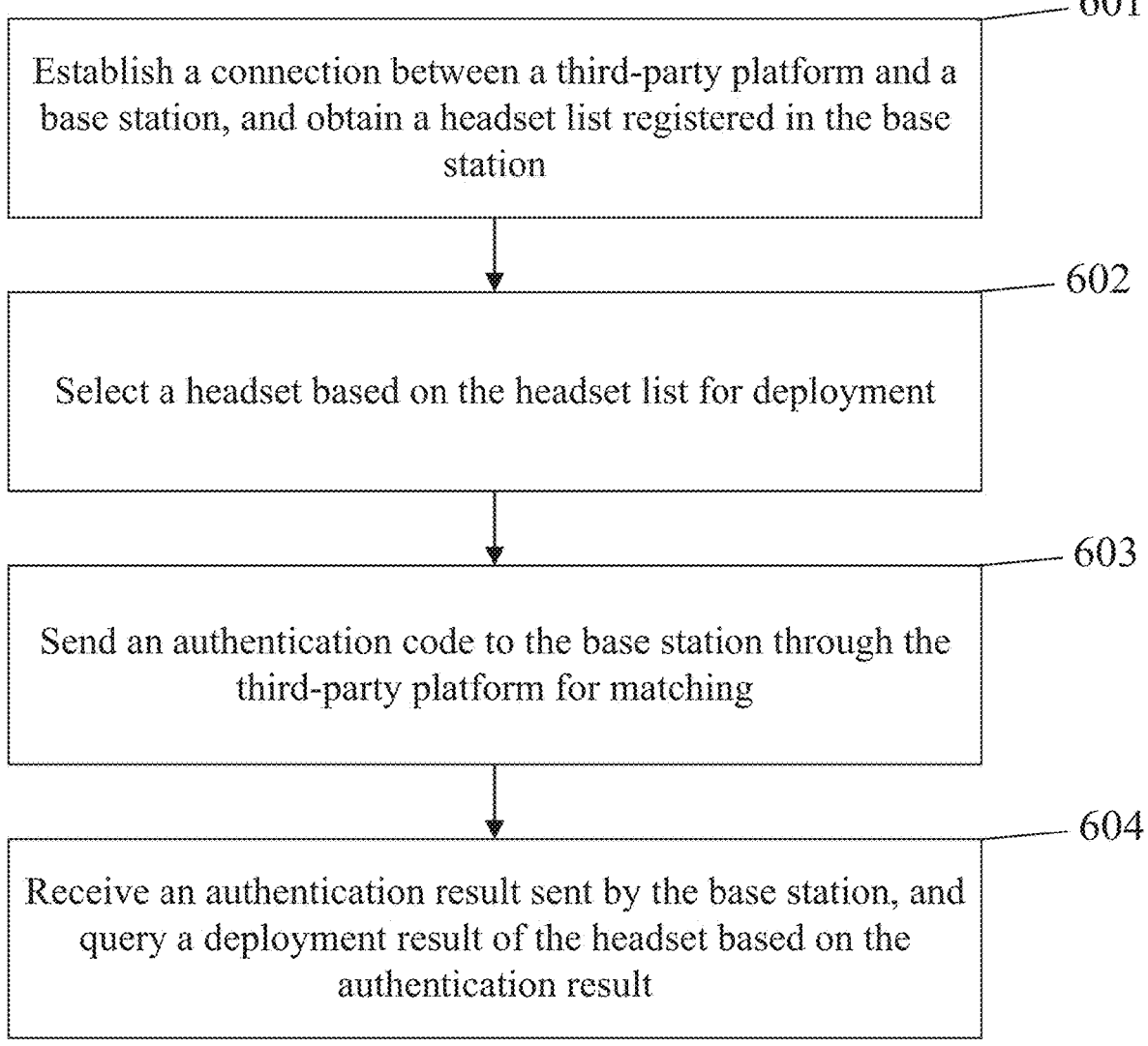

601

Establish a connection between a third-party platform and a base station, and obtain a headset list registered in the base station

602

Select a headset based on the headset list for deployment

603

Send an authentication code to the base station through the third-party platform for matching

604

Receive an authentication result sent by the base station, and query a deployment result of the headset based on the authentication result

FIG. 6

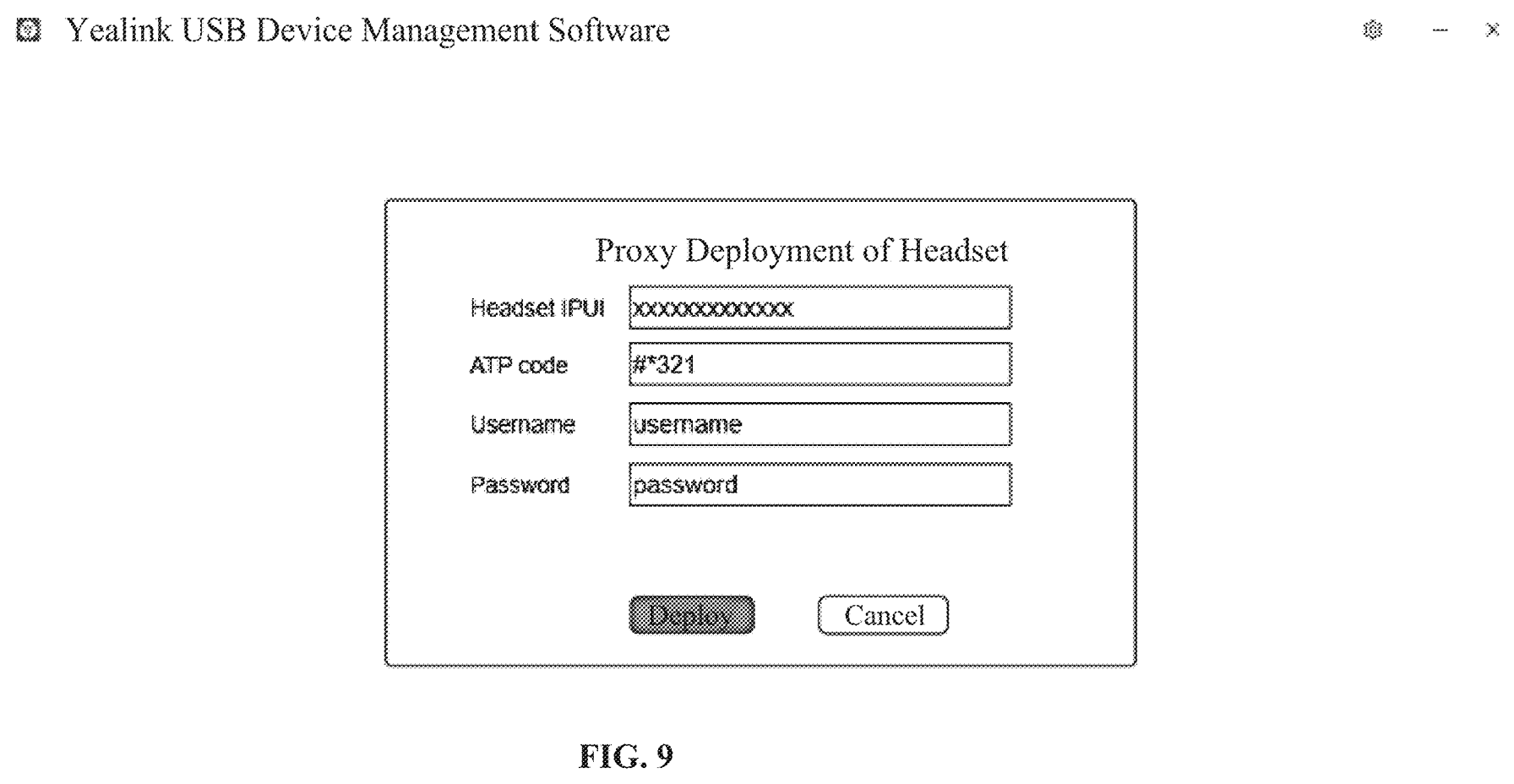

Yealink USB Device Management Software

Proxy Deployment of Headset

Headset IPUi    xxxxxxxxxxxxx

ATP code    #*321

Username    username

Password    password

Cancel

FIG. 9

METHOD AND SYSTEM FOR DEPLOYING WIRELESS HEADSET BASED ON THIRD-PARTY PLATFORM

CROSS-REFERENCE TO RELATED APPLICATIONS

The present application claims the benefit of Chinese Patent Application No. 202211497581.5 filed on Nov. 25, 2022, the contents of which are hereby incorporated by reference.

TECHNICAL FIELD

The present disclosure relates to the technical field of headset deployment, and in particular, to a method and system for deploying a wireless headset based on a third-party platform.

BACKGROUND

In the prior art, a wireless headset without a screen and a button can be registered only by an administrator through a background webpage of a Digital Enhanced Cordless Telecommunications (DECT) system (such as W70B, W80B, or W90B). An end user needs to log in to a background of the DECT system and enables a registration mode through the webpage. However, some end users do not have administrator permission to log in to the background webpage, and for the DECT systems of foreign customers, account deployment is performed by an Auto Provisioning (Autop) code. Considering a maintenance workload of the deployment, customers are usually not recommended to perform the account deployment or modify any configuration through the webpage.

SUMMARY

The present disclosure provides a method and system for deploying a wireless headset based on a third-party platform, to reduce a difficulty in deploying a wireless headset and improve universality of deploying the wireless headset.

To achieve the above objective, a first aspect of the present disclosure provides a method for deploying a wireless headset based on a third-party platform, including:

receiving, by a third-party platform, a headset list sent by a base station, and selecting a headset based on the headset list for deployment;

after deploying the headset, sending, by the third-party platform, deployment information of the headset and authentication information of the third-party platform to the base station, to enable the base station to feed back an authentication result based on the deployment information and the authentication information; and obtaining, by the third-party platform, a deployment result of the headset based on the authentication result.

The present disclosure provides the method for deploying a wireless headset based on a third-party platform. The method includes: first receiving the headset list sent by the base station, and selecting the headset from the headset list for deployment; after deploying the headset, sending, by the third-party platform, the deployment information of the headset and the authentication information of the third-party platform to the base station, to enable the base station to determine, based on the authentication information and the deployment information, whether the third-party platform can deploy the headset, and ensure accurate deployment of the headset; and then receiving, by the third-party platform, the authentication result sent by the base station to obtain the deployment result of the headset. In this way, the headset no longer needs to be deployed on a background webpage, which reduces a difficulty in deploying a wireless headset and improves universality of the deployment method.

As a preferred example, before the receiving, by a third-party platform, a headset list sent by a base station, the method specifically includes:

enabling, by the third-party platform, a headset deployment function, and establishing a connection to the base station to register with the base station; and configuring, by the base station, an authentication code for the third-party platform, and saving the authentication code in an authentication code list of the base station.

Before the headset is deployed, the present disclosure first enables the headset deployment function of the third-party platform to deploy the headset by the third-party platform, and then configures the authentication code of the third-party platform by the base station, to verify that the third-party platform is qualified to deploy the wireless headset.

As a preferred example, the enabling the base station to feed back an authentication result based on the deployment information and the authentication information specifically includes:

receiving, by the base station, the deployment information of the headset and the authentication information that are sent by the third-party platform, and matching the received authentication information with the saved authentication code list to determine whether the received authentication information exists in the authentication code list; and if the received authentication information exists in the authentication code list, sending, by the base station, a prompt message indicating successful authentication to the third-party platform, where the prompt message includes the deployment information of the headset; or if the received authentication information does not exist in the authentication code list, sending, by the base station, a prompt message indicating failed authentication to the third-party platform.

The present disclosure deploys various information of the headset by the third-party platform, and then sends the deployment information of the deployed headset and the authentication information of the third-party platform to the base station, such that the base station first determines, based on the authentication information, whether the third-party platform is qualified for the deployment. If the third-party platform is qualified for the deployment, the deployment information of the headset is directly sent to the headset to complete the deployment of the headset.

As a preferred example, the obtaining a deployment result of the headset based on the authentication result specifically includes:

receiving, by the third-party platform, the authentication result sent by the base station, and determining, based on the authentication result, whether the headset is successfully deployed; and if the third-party platform receives the prompt message indicating successful authentication, determining that the headset is successfully deployed; or if the third-party platform receives the prompt message indicating failed authentication, determining that the headset fails to be deployed, and returning to a headset deployment page of the third-party platform.

Based on the prompt messages received by the third-party platform from the base station, the present disclosure determines whether the headset is successfully deployed. If the third-party platform receives, from the base station, a prompt message indicating that the headset is successfully deployed, it indicates that the headset is successfully deployed. If the third-party platform receives, from the base station, a prompt message indicating that the headset fails to be deployed, it indicates that the headset fails to be deployed. The present disclosure deploys the headset and obtains the deployment result of the headset by the third-party platform throughout the entire process, avoiding the deployment through the webpage and reducing the deployment difficulty.

As a preferred example, the obtaining a deployment result of the headset further includes:

querying, by a headset deployment function of the third-party platform, a successfully deployed headset saved on the third-party platform to obtain the deployment result of the headset.

The present disclosure can further obtain the deployment result of the headset by querying information of the successfully deployed headset saved on the third-party platform.

A second aspect of the present disclosure provides a method for deploying a wireless headset based on a third-party platform, including:

sending, by a base station, a headset list to a third-party platform registered with the base station;

receiving, by the base station, deployment information of a headset and authentication information that are sent by the third-party platform; and sending, by the base station, an authentication result to the third-party platform based on the authentication information and the deployment information.

According to the method for deploying a wireless headset based on a third-party platform in the present disclosure, the base station first sends the headset list to the third-party platform registered with the base station, then receives the deployment information of the headset and the authentication information that are sent by the third-party platform, determines, based on the authentication information, whether the third-party platform can deploy the headset, and deploys the headset based on the authentication result.

As a preferred example, the sending, by the base station, an authentication result to the third-party platform further includes:

determining, based on the authentication result, whether the base station sends the deployment information of the headset to the headset; and if the authentication result indicates successful authentication, determining that the base station sends the deployment information of the headset to the headset.

Based on a prompt message in the authentication result sent by the base station to the third-party platform, the present disclosure determines whether the base station sends a prompt message of the deployment of the headset to the headset. If the authentication information indicates successful authentication, the base station sends the received deployment information of the headset to the headset to complete the deployment of the headset.

A third aspect of the present disclosure provides a device for deploying a wireless headset based on a third-party platform, including a deployment module, an authentication module, and a determining module, where the deployment module is configured to enable a third-party platform to receive a headset list sent by a base station, and select a headset based on the headset list for deployment;

the authentication module is configured to: after the third-party platform deploys the headset, send deployment information of the headset and authentication information of the third-party platform to the base station, to enable the base station to feed back an authentication result based on the deployment information and the authentication information; and the determining module is configured to enable the third-party platform to obtain a deployment result of the headset based on the authentication result.

The present disclosure provides the device for deploying a wireless headset based on a third-party platform. At first, the headset list sent by the base station is received, and the headset is selected from the headset list for deployment. After the headset is deployed, the third-party platform is used to send the deployment information of the headset and an authentication code of the third-party platform to the base station, to enable the base station to determine, based on the authentication code, whether the third-party platform can deploy the headset, and ensure accurate deployment of the headset. Then, the third-party platform receives the authentication result sent by the base station to obtain the deployment result of the headset. In this way, the headset no longer needs to be deployed on a background webpage, which reduces a difficulty in deploying a wireless headset and improves universality of the deployment method.

A fourth aspect of the present disclosure provides a device for deploying a wireless headset based on a third-party platform, including a sending module, a receiving module, and a matching module, where the sending module is configured to enable a base station to send a headset list to a third-party platform registered with the base station;

the receiving module is configured to enable the base station to receive deployment information of a headset and authentication information that are sent by the third-party platform, and the matching module is configured to enable the base station to send an authentication result to the third-party platform based on the authentication information and the deployment information.

According to the device for deploying a wireless headset based on a third-party platform in the present disclosure, the base station first sends the headset list to the third-party platform registered with the base station, then receives the deployment information of the headset and the authentication information that are sent by the third-party platform, determines, based on the authentication information, whether the third-party platform can deploy the headset, and deploys the headset based on the authentication result.

A fifth aspect of the present disclosure provides a system for deploying a wireless headset based on a third-party platform, including a third-party platform and a base station, where the third-party platform is configured to execute the method for deploying a wireless headset in the first aspect, and the base station is configured to execute the method for deploying a wireless headset in the second aspect.

BRIEF DESCRIPTION OF THE DRAWINGS

FIG. 1 is a schematic flowchart of a method for deploying a wireless headset based on a third-party platform according to Embodiment 1 of the present disclosure;

FIG. 6 is a schematic flowchart of a method for deploying a wireless headset based on a third-party platform according to Embodiment 2 of the present disclosure;

FIG. 9 is a schematic diagram of deploying a headset based on Yealink USB Connect (YUC) software according to Embodiment 2 of the present disclosure.

DETAILED DESCRIPTION

Figure 2:
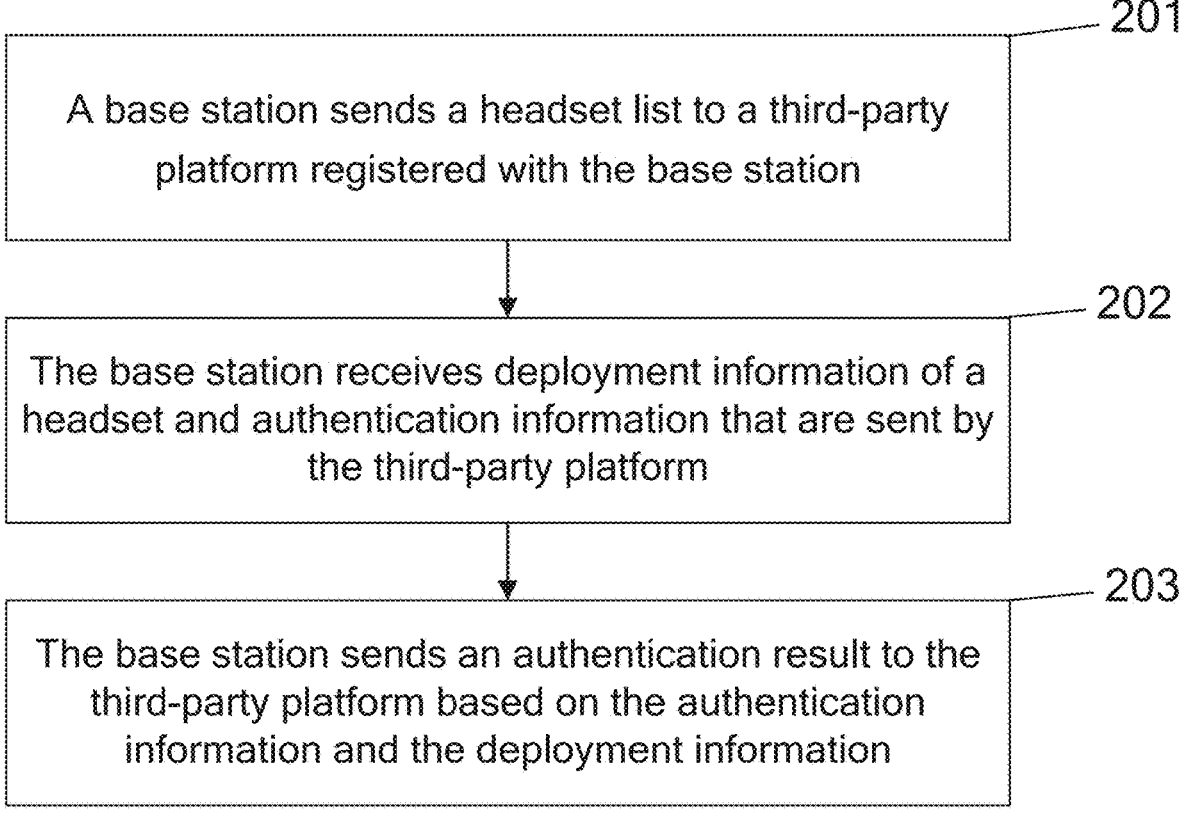
FIG. 2 is a schematic flowchart of another method for deploying a wireless headset based on a third-party platform according to Embodiment 1 of the present disclosure.

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Embodiment 1

This embodiment provides a method for deploying a wireless headset based on a third-party platform. A procedure of the method is shown in FIG. 1, and mainly includes steps 101 to 103. A specific procedure of each step is as follows:

Step 101: A third-party platform receives a headset list sent by a base station, and selects a headset based on the headset list for deployment.

Before performing this step, the third-party platform enables a headset deployment function and establishes a connection to the base station to register with the base station; and the base station configures an authentication code for the third-party platform, and saves the authentication code in an authentication code list of the base station.

Step 102: After deploying the headset, the third-party platform sends deployment information of the headset and authentication information of the third-party platform to the base station, to enable the base station to feed back an authentication result based on the deployment information and the authentication information.

In this embodiment, this step specifically includes: The base station receives the deployment information of the headset and the authentication code that are sent by the third-party platform, matches the received authentication code with the saved authentication code list, and determines whether the received authentication code exists in the authentication code list. If the received authentication code exists in the authentication code list, the base station sends a prompt message indicating successful authentication to the third-party platform. The prompt message includes the deployment information of the headset. If the received authentication code does not exist in the authentication code list, the base station sends a prompt message indicating failed authentication to the third-party platform.

Step 103: The third-party platform obtains a deployment result of the headset based on the authentication result.

In this embodiment, this step specifically includes: The third-party platform receives the authentication result sent by the base station, and determines, based on the authentication result, whether the headset is successfully deployed. If the third-party platform receives the prompt message indicating successful authentication, it is determined that the headset is successfully deployed. If the third-party platform receives the prompt message indicating failed authentication, it is determined that the headset fails to be deployed, a headset deployment page of the third-party platform is returned.

In this embodiment, a successfully deployed headset saved on the third-party platform can be further queried by the headset deployment function of the third-party platform, to obtain the deployment result of the headset.

This embodiment provides another method for deploying a wireless headset based on a third-party platform. A main procedure of the method is shown in FIG. 2, and mainly includes steps 201 to 203. A specific procedure of each step is as follows:

Step 201: A base station sends a headset list to a third-party platform registered with the base station.

In this embodiment, this step specifically includes: The base station connects to the third-party platform, and sends the headset list to the third-party platform.

Step 202: The base station receives deployment information of a headset and authentication information that are sent by the third-party platform.

In this embodiment, this step specifically includes: The base station receives the deployment information of the headset and the authentication information that are sent by the third-party platform.

Step 203: The base station sends an authentication result to the third-party platform based on the authentication information and the deployment information.

In this embodiment, this step includes: The base station receives the deployment information of the headset and an authentication code that are sent by the third-party platform, matches the received authentication code with a saved authentication code list, and determines whether the received authentication code exists in the authentication code list. If the received authentication code exists in the authentication code list, the base station sends a prompt message indicating successful authentication to the third-party platform. The prompt message includes the deployment information of the headset. If the received authentication code does not exist in the authentication code list, the base station sends a prompt message indicating failed authentication to the third-party platform.

In this embodiment, this step further includes: determining, based on the authentication result, whether the base station sends the deployment information of the headset to the headset; and if the authentication result indicates the successful authentication, determining that the base station sends the deployment information of the headset to the headset.

Figure 3:
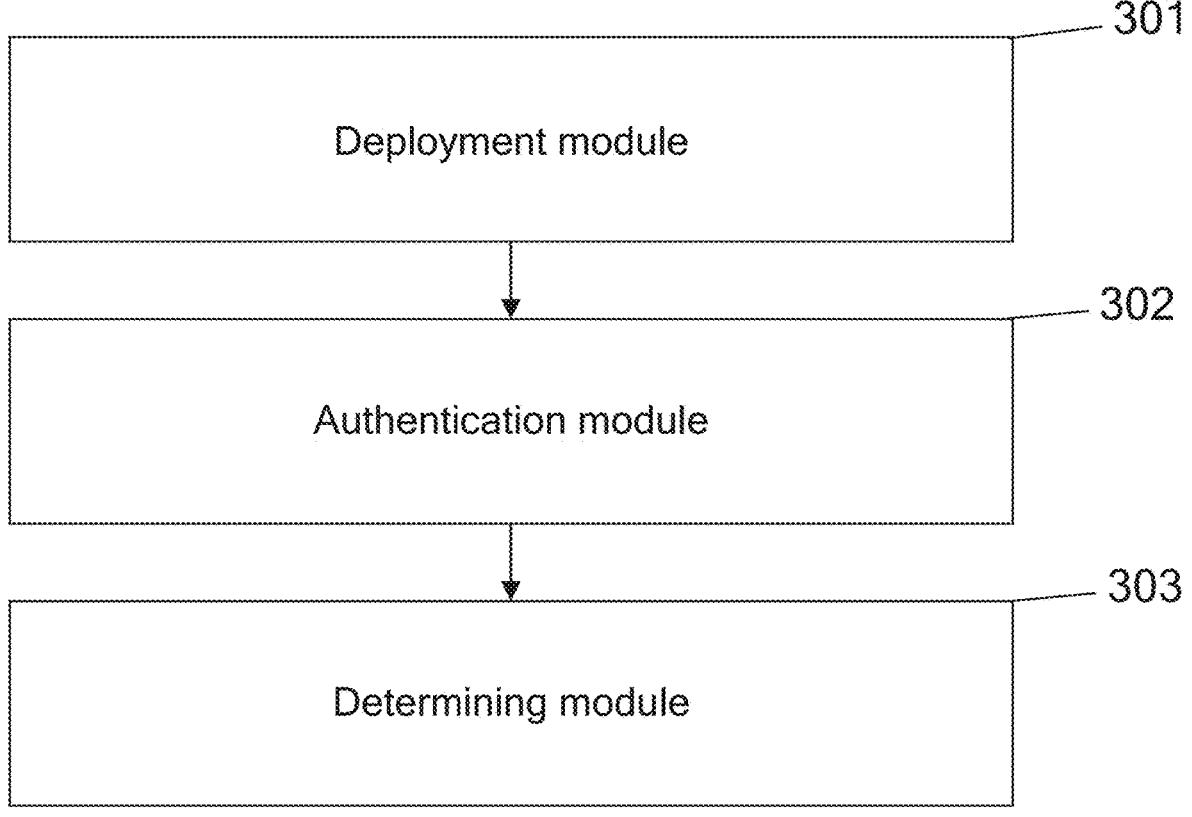
FIG. 3 is a schematic structural diagram of a device for deploying a wireless headset based on a third-party platform according to Embodiment 1 of the present disclosure.

This embodiment further provides a device for deploying a wireless headset based on a third-party platform, including a deployment module 301, an authentication module 302, and a determining module 303, as shown in FIG. 3.

The deployment module 301 is configured to enable a third-party platform to receive a headset list sent by a base station, and select a headset based on the headset list for deployment.

The authentication module 302 is configured to: after the third-party platform deploys the headset, send deployment information of the headset and authentication information of the third-party platform to the base station, to enable the base station to feed back an authentication result based on the deployment information and the authentication information.

The determining module 303 is configured to enable the third-party platform to obtain a deployment result of the headset based on the authentication result.

In another implementation example, the device for deploying a wireless headset based on a third-party platform includes a processor. The processor is configured to execute the foregoing program modules stored in a memory, including the deployment module 301, the authentication module 302, and the determining module 303.

Figure 4:
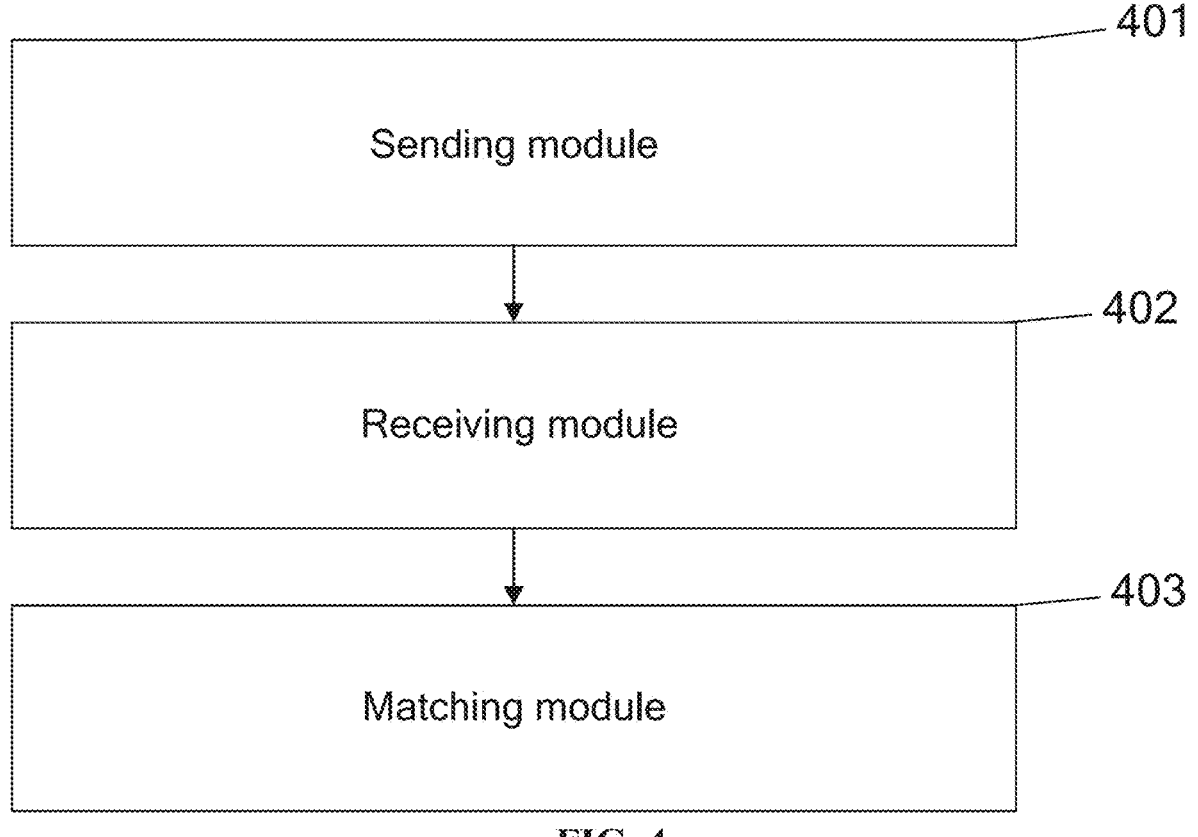
FIG. 4 is another schematic structural diagram of another device for deploying a wireless headset based on a third-party platform according to Embodiment 1 of the present disclosure.

This embodiment provides another device for deploying a wireless headset based on a third-party platform, including a sending module 401, a receiving module 402, and a matching module 403, as shown in FIG. 4.

The sending module 401 is configured to enable a base station to send a headset list to a third-party platform registered with the base station.

The receiving module 402 is configured to enable the base station to receive deployment information of a headset and authentication information that are sent by the third-party platform.

The matching module 403 is configured to enable the base station to send an authentication result to the third-party platform based on the authentication information and the deployment information.

In another implementation example, the device for deploying a wireless headset based on a third-party platform includes a processor. The processor is configured to execute the foregoing program modules stored in a memory, including the sending module 401, the receiving module 402, and the matching module 403.

Figure 5:
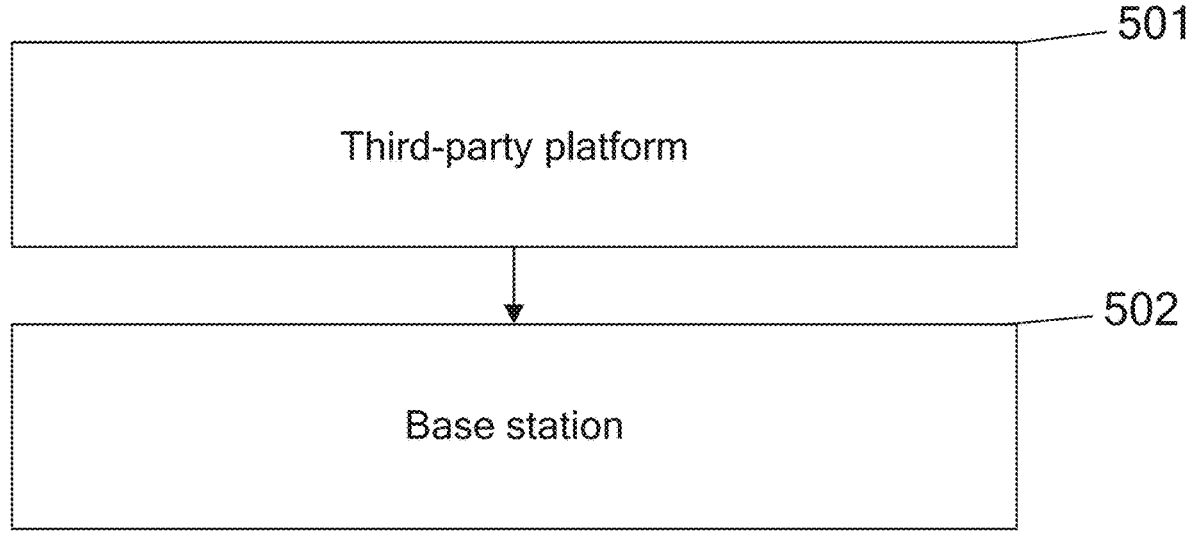
FIG. 5 is a schematic structural diagram of a system for deploying a wireless headset based on a third-party platform according to Embodiment 1 of the present disclosure.

This embodiment further provides a system for deploying a wireless headset based on a third-party platform, including a third-party platform 501 and a base station 502, as shown in FIG. 5. The third-party platform 501 is configured to execute the method for deploying a wireless headset based on a third-party platform in Embodiment 1, and the base station 502 is configured to execute the another method for deploying a wireless headset based on a third-party platform in Embodiment 1.

In this embodiment, according to the method, device, and system for deploying a wireless headset, the headset list sent by the base station is received, and the headset is selected from the headset list for deployment. After the headset is deployed, the third-party platform sends the deployment information of the headset and the authentication information of the third-party platform to the base station, to enable the base station to determine, based on the authentication information and the deployment information, whether the third-party platform can deploy the headset, and ensure accurate deployment of the headset. Then, the third-party platform receives the authentication result sent by the base station to obtain the deployment result of the headset. In this way, the headset no longer needs to be deployed on a background webpage, which reduces a difficulty in deploying a wireless headset and improves universality of the deployment method.

Embodiment 2

This embodiment provides a method for deploying a wireless headset based on a third-party platform. A main procedure of the method is shown in FIG. 6, and mainly includes steps 601 to 604. A specific procedure of each step is as follows:

Step 601: Establish a connection between a third-party platform and a base station, and obtain a headset list registered in the base station.

In this embodiment, this step mainly includes: enabling a headset deployment function of the third-party platform and establishing the connection to the base station to register with the base station; and configuring, by the base station, an authentication code for the third-party platform, and saving the authentication code in an authentication code list of the base station.

In this embodiment, this step specifically includes: selecting a handset as the third-party platform, registering the handset with the base station, obtaining the headset list registered in the base station, enabling the headset deployment function by a configuration item of the handset, and setting a specific Autop code. In this embodiment, the base station is configured to set features.deploy_for_headset.enable=1, and a code for an outgoing call by features.deploy_for_headset.code_list=#*321,999.

Step 602: Select a headset based on the headset list for deployment.

Figure 7:
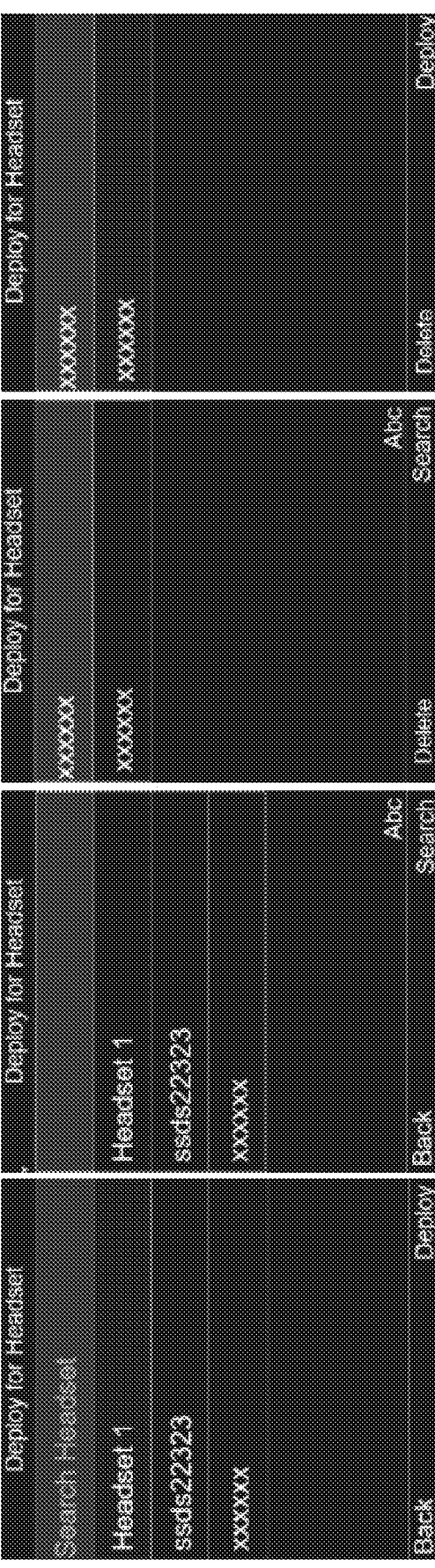
FIG. 7 is a schematic diagram of deploying a wireless headset based on a handset according to Embodiment 2 of the present disclosure.

In this embodiment, this step is mainly as follows: The handset accesses a Deploy for Headset function under features, selects a to-be-deployed headset for deployment, and enters a details interface of the Deploy for Headset function of the DECT handset. As shown in FIG. 7, the Deploy for Headset function is available, displaying all registered headsets. An end user can select any to-be-deployed headset and click Deploy.

Step 603: Send the authentication code to the base station through the third-party platform for matching.

In this embodiment, this step is as follows: The base station receives deployment information of the headset and authentication information that are sent by the third-party platform, and matches the received authentication code with the saved authentication code list to determine whether the received authentication code exists in the authentication code list.

In this embodiment, this step is specifically as follows: The handset enters a dialing interface. A code is input, and the handset replaces the headset to make an outgoing call. In this case, the base station checks whether the code for the outgoing call matches a previously set code list. If the matching is successful, the outgoing call continues.

Step 604: Receive an authentication result sent by the base station, and query a deployment result of the headset based on the authentication result.

In this embodiment, this step is as follows: The third-party platform receives the authentication result sent by the base station, and determines, based on the authentication result, whether the headset is successfully deployed.

In this embodiment, this step is specifically as follows. After a customer who already has a local code and URL dials a number, a username and a password are input in a pop-up window to complete the deployment of the headset and deliver account information. For a customer who needs to interact with a server to input a dual-tone multi-frequency (DTMF), after a number is dialed, the DTMF is input according to a voice prompt of the server to complete the deployment of the headset and deliver account information. If the code for the outgoing call is not matched, it is prompted that the output code is not matched, and a selection interface of the handset is returned for redeployment.

In this embodiment, after the handset accesses the Deploy for Headset function, for a customer adopting an Autop scheme, the Deploy for Headset function is ticked after successful deployment to indicate the successful deployment, such that a user can determine whether the deployment is successful. After the handset accesses the Deploy for Headset function, for a customer adopting a DTMF scheme, after the successful deployment, the user can determine, based on an updated handset name, whether the deployment is successful.

This embodiment further provides a method for deploying a headset based on an application program for managing connections of USB devices, for example, YUC software. A main deployment procedure is shown in FIG. 6, and the method mainly includes steps 601 to 604. A specific procedure of each step is as follows:

Step 601: Establish a connection between a third-party platform and a base station, and obtain a headset list registered in the base station.

In this embodiment, this step mainly includes: enabling a headset deployment function of the third-party platform and establishing the connection to the base station to register with the base station; and configuring, by the base station, an authentication code of the third-party platform, and saving the authentication code in an authentication code list of the base station.

Figure 8:
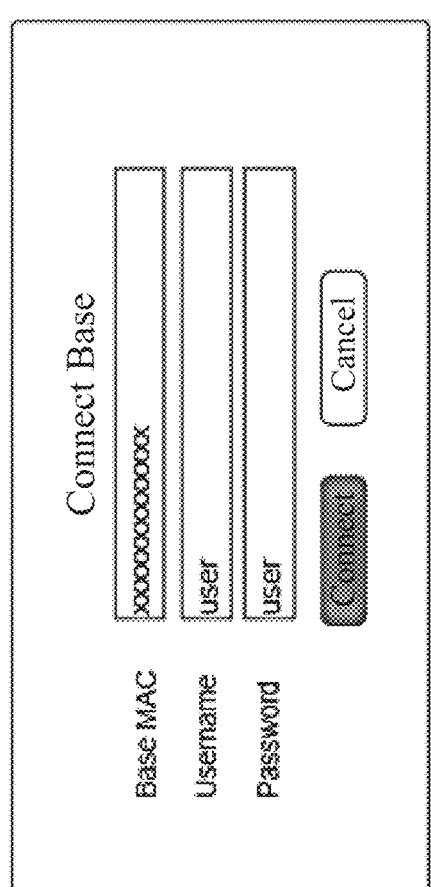
FIG. 8 is a schematic diagram of establishing a connection to a base station according to Embodiment 2 of the present disclosure.

In this embodiment, this step mainly includes: selecting the headset deployment function by the YUC software, establishing the connection to the base station, and obtaining the headset list registered in the base station. An account and a password that are used are the same as those used on a webpage. A specific connection method is shown in FIG. 8, including Base MAC, Username, and Password.

Step 602: Select a headset based on the headset list for deployment.

In this embodiment, this step includes: after obtaining the headset list by the YUC software, selecting the headset based on the headset list for deployment, and inputting deployment information of the headset in an interface of proxy deployment of headset via the YUC software. The deployment information is shown in FIG. 9, including Base MAC (MAC address of the base station for registering the headset), Username (username of the base station), Password (password of the base station), Headset (to-be-deployed headset), ATP code (code when the to-be-deployed headset executes Autop), Username (username of the to-be-deployed headset or authentication code of the to-be-deployed headset (when deploying the headset with a separate code without the username)), and Password (password of the to-be-deployed headset) (optional).

Step 603. Send the authentication code to the base station through the third-party platform for matching.

In this embodiment, this step is as follows: The base station receives the deployment information of the headset and authentication information that are sent by the third-party platform, and matches the received authentication code with the saved authentication code list to determine whether the received authentication code exists in the authentication code list.

In this embodiment, this step is specifically as follows: The YUC software obtains the headset list of the base station, and a customer selects the to-be-deployed headset, and inputs information. After Deploy of the interface of proxy deployment of headset is clicked, the YUC software transfers the information to the base station, and obtains a location of the headset, namely, headset x. The base station matches the input code and corresponds the input code to autoprovision.x.code. The base station corresponds the username and the password to configuration items handset.x.auto_provision.server.username and handset.x auto_provision-.server.password, respectively. The base station accesses the corresponding URL (autoprovision.x.url) based on a correspondence of the code, and then performs authentication.

Step 604: Receive an authentication result sent by the base station, and query a deployment result of the headset based on the authentication result.

In this embodiment, this step specifically includes: The third-party platform receives the authentication result sent by the base station, and determines, based on the authentication result, whether the headset is successfully deployed.

In this embodiment, this step specifically includes: After the headset is deployed, the account information is delivered, or information of the deployed headset with a view-only function can be queried by clicking the headset list by the YUC software. Based on the information of the headset, a user can determine whether the headset is successfully deployed.

This embodiment provides the method for deploying a wireless headset based on a handset or YUC software. In this embodiment, the handset and the computer software YUC are used to compensate for a lack of a digital button and an LCD on the headset. Therefore, the two methods can be used to deploy the headset, without a need to perform the deployment from a background web user interface of the headset (that is, a web user interface of the base station). This reduces a difficulty in deploying a wireless headset and improves universality of deploying the wireless headset.

The objectives, technical solutions, and beneficial effects of the present disclosure are further described in detail through the above specific embodiments. It should be understood that the above are merely some specific embodiments of the present disclosure, but are not intended to limit the protection scope of the present disclosure. It should be particularly noted that, any modifications, equivalent substitutions, improvements, and the like made by those skilled in the art within the spirit and principle of the present disclosure should be included within the protection scope of the present disclosure.

The invention claimed is:

1. A method for deploying a wireless headset based on a third-party platform, comprising:

receiving, by a third-party platform, a headset list sent by a base station, and selecting a headset based on the headset list for deployment;

after deploying the headset, sending, by the third-party platform, deployment information of the headset and authentication information of the third-party platform to the base station, to enable the base station to feed back an authentication result based on the deployment information and the authentication information; and obtaining, by the third-party platform, a deployment result of the headset based on the authentication result.

2. The method for deploying the wireless headset based on the third-party platform according to claim 1, wherein before the receiving, by a third-party platform, a headset list sent by a base station, the method specifically comprises:

enabling, by the third-party platform, a headset deployment function, and establishing a connection to the base station to register with the base station; and configuring, by the base station, an authentication code for the third-party platform, and saving the authentication code in an authentication code list of the base station.

3. The method for deploying the wireless headset based on the third-party platform according to claim 2, wherein the enabling the base station to feed back an authentication result based on the deployment information and the authentication information specifically comprises:

receiving, by the base station, the deployment information of the headset and the authentication information that are sent by the third-party platform, and matching the received authentication information with the saved authentication code list to determine whether the received authentication information exists in the authentication code list; and if the received authentication information exists in the authentication code list, sending, by the base station, a prompt message indicating successful authentication to the third-party platform, wherein the prompt message comprises the deployment information of the headset; or if the received authentication information does not exist in the authentication code list, sending, by the base station, a prompt message indicating failed authentication to the third-party platform.

4. The method for deploying the wireless headset based on the third-party platform according to claim 3, wherein the obtaining a deployment result of the headset based on the authentication result specifically comprises:

receiving, by the third-party platform, the authentication result sent by the base station, and determining, based on the authentication result, whether the headset is successfully deployed; and if the third-party platform receives the prompt message indicating successful authentication, determining that the headset is successfully deployed; or if the third-party platform receives the prompt message indicating failed authentication, determining that the headset fails to be deployed, and returning to a headset deployment page of the third-party platform.

5. The method for deploying the wireless headset based on the third-party platform according to claim 1, wherein the obtaining a deployment result of the headset further comprises:

querying, by a headset deployment function of the third-party platform, a successfully deployed headset saved on the third-party platform to obtain the deployment result of the headset.

6. A device for deploying a wireless headset based on a third-party platform, comprising a deployment module, an authentication module, and a determining module, wherein the deployment module is configured to enable a third-party platform to receive a headset list sent by a base station, and select a headset based on the headset list for deployment;

the authentication module is configured to: after the third-party platform deploys the headset, send deployment information of the headset and authentication information of the third-party platform to the base station, to enable the base station to feed back an authentication result based on the deployment information and the authentication information; and the determining module is configured to enable the third-party platform to obtain a deployment result of the headset based on the authentication result.

7. A device for deploying a wireless headset based on a third-party platform, comprising a sending module, a receiving module, and a matching module, wherein the sending module is configured to enable a base station to send a headset list to a third-party platform registered with the base station;

the receiving module is configured to enable the base station to receive deployment information of a headset and authentication information that are sent by the third-party platform; and the matching module is configured to enable the base station to send an authentication result to the third-party platform based on the authentication information and the deployment information.

8. A system for deploying a wireless headset based on a third-party platform, comprising a third-party platform and a base station, wherein the third-party platform is configured to execute the method for deploying the wireless headset according to claim 1.

9. A system for deploying a wireless headset based on a third-party platform, comprising a third-party platform and a base station, wherein the third-party platform is configured to execute the method for deploying the wireless headset according to claim 2.

10. A system for deploying a wireless headset based on a third-party platform, comprising a third-party platform and a base station, wherein the third-party platform is configured to execute the method for deploying the wireless headset according to claim 3.

11. A system for deploying a wireless headset based on a third-party platform, comprising a third-party platform and a base station, wherein the third-party platform is configured to execute the method for deploying the wireless headset according to claim 4.

12. A system for deploying a wireless headset based on a third-party platform, comprising a third-party platform and a base station, wherein the third-party platform is configured to execute the method for deploying the wireless headset according to claim 5.

13. A system for deploying a wireless headset based on a third-party platform, comprising a third-party platform and a base station, wherein the third-party platform is the device for deploying a wireless headset based on a third-party platform according to claim 6.

14. A system for deploying a wireless headset based on a third-party platform, comprising a third-party platform and a base station, wherein the base station is the device for deploying a wireless headset based on a third-party platform according to claim 7.

* * * * *